United States Patent
Takaku et al.

(10) Patent No.: US 11,287,107 B2
(45) Date of Patent: Mar. 29, 2022

(54) OPTICAL WAVELENGTH CONVERSION DEVICE

(71) Applicant: NGK SPARK PLUG CO., LTD., Nagoya (JP)

(72) Inventors: Shohei Takaku, Nagoya (JP); Yosuke Yatsuya, Nagoya (JP); Yusuke Katsu, Nagoya (JP); Tomoo Tanaka, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 16/968,693

(22) PCT Filed: Oct. 31, 2018

(86) PCT No.: PCT/JP2018/040537
§ 371 (c)(1),
(2) Date: Aug. 10, 2020

(87) PCT Pub. No.: WO2019/159441
PCT Pub. Date: Aug. 22, 2019

(65) Prior Publication Data
US 2021/0018160 A1    Jan. 21, 2021

(30) Foreign Application Priority Data
Feb. 14, 2018 (JP) .............................. JP2018-024282

(51) Int. Cl.
*F21V 7/30* (2018.01)
*F21V 29/70* (2015.01)

(52) U.S. Cl.
CPC ................ *F21V 7/30* (2018.02); *F21V 29/70* (2015.01)

(58) Field of Classification Search
CPC .......... F21V 7/30; F21V 29/70; F21V 29/502; F21V 9/32; G02B 5/20; G02B 5/26;
(Continued)

(56) References Cited

U.S. PATENT DOCUMENTS

2008/0089089 A1    4/2008 Hama et al.
2010/0013373 A1*   1/2010 Hata .................... H05B 33/145
                                            313/502
(Continued)

FOREIGN PATENT DOCUMENTS

CN    102420283 A    4/2012
EP     3396232 A1   10/2018
(Continued)

OTHER PUBLICATIONS

Japan Patent Office, International Search Report issued in corresponding Application No. PCT/JP2018/040537 dated Jan. 29, 2019.
(Continued)

*Primary Examiner* — Rajarshi Chakraborty
*Assistant Examiner* — Glenn D Zimmerman
(74) *Attorney, Agent, or Firm* — Stites & Harbison, PLLC; Jeffrey A. Haeberlin; James R. Hayne (57) ABSTRACT

An optical wavelength conversion device includes an optical wavelength conversion member configured to convert the wavelength of incident light; a heat dissipation member which is more excellent in heat dissipation than the optical wavelength conversion member; and a joint portion which joins the optical wavelength conversion member and the heat dissipation member together. The optical wavelength conversion member includes a plate-shaped ceramic fluorescent body and a reflecting film disposed on a heat dissipation member-side surface of the ceramic fluorescent
(Continued)

body. The joint portion has a thermal conductivity of 120 W/mK or more. The joint portion has a melting point of 240° C. or higher.

6 Claims, 6 Drawing Sheets

(58) Field of Classification Search
CPC .. G02B 7/181; G02B 7/008; G02B 2207/113; G02B 27/1006; G02B 27/14
See application file for complete search history.

(56) References Cited

U.S. PATENT DOCUMENTS

| | | | |
|---|---|---|---|
| 2011/0140590 A1* | 6/2011 | Nakamura | H01L 33/60 313/113 |
| 2012/0074434 A1 | 3/2012 | Park et al. | |
| 2012/0146077 A1* | 6/2012 | Nakatsu | H01L 33/486 257/98 |
| 2012/0176772 A1* | 7/2012 | Maekawa | G02B 5/0231 362/97.1 |
| 2012/0230007 A1 | 9/2012 | Kawakami | |
| 2014/0001636 A1 | 1/2014 | Saito et al. | |
| 2015/0179878 A1 | 6/2015 | Park et al. | |
| 2016/0040857 A1* | 2/2016 | Inoue | F21V 9/32 362/343 |
| 2017/0036961 A1* | 2/2017 | Minami | B23K 35/325 |
| 2017/0288174 A1* | 10/2017 | Ueda | H01L 51/5228 |
| 2018/0003363 A1* | 1/2018 | Furuyama | C04B 41/85 |
| 2020/0058830 A1* | 2/2020 | Furuyama | G03B 21/204 |
| 2020/0182424 A1* | 6/2020 | Yuge | F21S 41/675 |

FOREIGN PATENT DOCUMENTS

| | | | | |
|---|---|---|---|---|
| JP | 2007-201354 A | | 8/2007 | |
| JP | 2012-104267 A | | 5/2012 | |
| JP | 2012-190628 A | | 10/2012 | |
| JP | WO2018230333 A1 | * | 4/2020 | ............... G02B 5/26 |
| JP | WO2019064980 A1 | * | 9/2020 | ............ F21S 41/153 |
| WO | 2014-065051 A1 | | 5/2014 | |
| WO | 2014-123145 A1 | | 8/2014 | |
| WO | 2017-110031 A1 | | 6/2017 | |
| WO | WO-2017110031 A1 | * | 6/2017 | ............... F21K 9/64 |
| WO | WO-2018230333 A1 | * | 12/2018 | ............. G02B 7/008 |

OTHER PUBLICATIONS

Taiwan Intellectual Property Office, Office Action (Notification for the Opinion of Examination) issued in corresponding Application No. 108104466, dated Jan. 15, 2020.
Japan Patent Office, Office Action issued in corresponding Application No. 2020-500269 dated Nov. 17, 2020 (English language translation not available).
The State Intellectual Property Office of People's Republic of China, The First Office Action issued in corresponding Application No. 201880089083.2 dated Aug. 30, 2021.
Taiwan Intellectual Property Office, Office Action (Notification for the Opinion of Examination) issued in corresponding Application No. 108104466 dated Jun. 4, 2021.
European Patent Office, Extended European Search Report issued in corresponding Application No. EP 18 90 6586, dated Oct. 15, 2021.

* cited by examiner

OPTICAL WAVELENGTH CONVERSION DEVICE

CROSS REFERENCE TO RELATED APPLICATIONS

This international patent application claims priority from Japanese Patent Application No. 2018-24282 filed with the Japanese Patent Office on Feb. 14, 2018, and the entire contents of Japanese Patent Application. No. 2018-24282 are incorporated by reference in this international application.

TECHNICAL FIELD

The present disclosure relates to an optical wavelength conversion device.

BACKGROUND ART

In headlamps, various lighting fixtures, laser projectors, etc., white light is obtained by converting the wavelength of blue light from a light emitting diode (LED) or a semiconductor laser diode (LD) using a fluorescent body serving as an optical wavelength conversion member.

Known examples of the fluorescent body include resin-based based and glass-based fluorescent bodies. To cope with increasing output power of light sources using lasers, ceramic fluorescent bodies excellent in durability are increasingly used for optical wavelength conversion devices.

The fluorescent body generates heat when irradiated with light. When the fluorescent body generates heat and its temperature increases, temperature quenching occurs, in which the fluorescent performance of the fluorescent body such as the intensity of light emitted therefrom (i.e., light emission intensity: fluorescence intensity) decreases. Therefore, to allow the fluorescent body to emit light efficiently, it is necessary to dissipate the heat from the fluorescent body to the outside.

In one known optical wavelength conversion device, a heat dissipation member is soldered to an optical wavelength conversion member (see Patent Document 1). However, the melting point of the solder is 200° C. or lower. Therefore, in the above optical wavelength conversion device, heat generated from the fluorescent body irradiated with laser light may re-melt the solder, causing a reduction in the joint strength between the heat dissipation member and the optical wavelength conversion member. This causes a defect such as breakage or detachment of the optical wavelength conversion member from the heat dissipation member.

Moreover, the defect results in insufficient heat transfer from the optical wavelength conversion member to the heat dissipation member, so that heat dissipation efficiency lowers. This problem also occurs even when a resin-based adhesive is used instead of the solder for joining.

In an optical wavelength conversion device devised in view of the above, silver nanoparticles are used to loin the optical wavelength conversion member to the heat dissipation member (see Patent Document 2).

PRIOR ART DOCUMENTS

Patent Documents

Patent Document 1: International Publication No. WO2014/065051
Patent Document 2: International Publication No. WO2017/110031

SUMMARY OF THE INVENTION

Problem to be Solved by the Invention

In the optical wavelength conversion device using the silver nanoparticles, the occurrence of a defect due to re-melting of solder can be prevented. However, in this optical wavelength conversion device, there is a room for improvement in heat transferability from the optical wavelength conversion member to the heat dins cation member.

One aspect of the present disclosure preferably provides an optical wavelength conversion device in which heat can be efficiently dissipated from the optical wavelength conversion member while the joint strength between the optical wavelength conversion member and the heat dissipation member is maintained.

Means for Solving the Problems

One mode of the present disclosure is an optical wavelength conversion device comprising an optical wavelength conversion member configured to convert the wavelength of incident light; a heat dissipation member which is more excellent in heat dissipation than the optical wavelength conversion member; and a joint portion which joins the optical wavelength conversion member and the heat dissipation member together. The optical wavelength conversion member includes a plate-shaped ceramic fluorescent body, and a reflecting disposed on a heat dissipation member-side surface of the ceramic fluorescent body. The joint portion has a thermal conductivity of 120 W/mK or more. The joint portion has a melting point of 240° C. or higher.

In the above structure, the heat dissipation performance of the joint portion serving as a heat dissipation path between the optical wavelength conversion member and the heat dissipation member can be increased, so that heat can be more efficiently dissipated from the optical wavelength conversion member.

Moreover, even when the temperature of the ceramic fluorescent body increases due to laser irradiation, the joint portion joining the optical wavelength conversion member and the heat dissipation member together is unlikely to melt. Therefore, high heat resistance and high joint strength can be maintained even in a high laser power range. Thus, the heat dissipation path between the optical wavelength conversion member and the heat dissipation member can be maintained even in the high power range, and heat can be dissipated from the optical wavelength conversion member efficiently.

In the one mode of the present disclosure, the joint portion may be formed only of old, silver, copper, or a combination thereof. In this structure, the joint portion which allows the heat to be dissipated from the optical wavelength conversion member efficiently can be formed easily and reliably.

In the one mode of the present disclosure, the joint portion may have pores. The joint portion may have a porosity of 40% or less. In this structure, while the heat dissipation performance of the joint portion is maintained, the difference in thermal expansion between the heat dissipation member and the optical wavelength conversion member is reduced, so that breakage of the joint portion due to thermal shock can be prevented.

In the one mode of the present disclosure, the joint portion may have a joint region located between the optical wavelength conversion member and the heat dissipation member and having an average thickness of 1 μm or more. In this structure, the joint strength between the optical wavelength conversion member and the heat dissipation member can be increased further.

In the one mode of the present disclosure, the joint portion may have a joint region located between the optical wavelength conversion member and the heat dissipation member and having an average thickness equal to or less than 50% of the sum of the average thickness of the ceramic fluorescent body and the average thickness of the joint region. In this structure, an excessive increase in the thickness of the joint region is prevented, and the heat generated in the optical wavelength conversion member can be more rapidly transferred to the heat dissipation member. Therefore, the heat can be more efficiently dissipated from the optical wavelength conversion member.

The one mode of the present disclosure may further comprise a resin layer which at least partially covers a surface of the joint portion which is not joined to the optical wavelength conversion member and to the heat dissipation member. In this structure, oxidation, sulfurization, etc. at the joint interfaces of the joint portion can be prevented. Therefore, the durability of the optical wavelength conversion device can be improved.

In the one mode of the present disclosure, the resin layer may contain a fluorine-based resin as a main component. In this structure, the resin layer can have reduced permeability to water and gases such as $O_2$, $H_2S$, and $SO_2$, so that the durability of the optical wavelength conversion device can be improved more reliably.

In the one mode of the present disclosure, the heat dissipation member may have at least one notch on its surface joined to the joint portion. In this structure, stress generated due to the difference in thermal expansion between the optical wavelength conversion member and the heat dissipation member when they are joined together can be reduced. Therefore, the joint strength is improved, and the heat dissipation is improved. Moreover, since thermal stress generated in the heat dissipation member in a high temperature environment is reduced, breakage such as delamination of the optical wavelength conversion member during operation can be prevented.

In the one mode of the present disclosure, at least one corner portion of the optical wavelength conversion member as viewed in a thickness direction thereof may be rounded. In this structure, stress generated due to the difference in thermal expansion between the optical wavelength conversion member and the heat dissipation member when they are joined together can be reduced. Therefore, the joint strength is improved, and the heat dissipation is improved. Moreover, stress generated in the optical wavelength conversion member during irradiation with laser light tends to be uniform in plane directions. Therefore, forces acting on the upper and lower surfaces of the optical wavelength conversion member can be reduced, so that breakage such as delamination of the optical wavelength conversion member during operation can be prevented.

DESCRIPTION OF REFERENCE NUMERALS 1, 1A, 1B . . . optical wavelength conversion device, 2 . . . optical wavelength conversion member, 3, 3B . . . heat dissipation member, 4 . . . joint portion, 5 . . . package, 6 . . . resin layer, 10 . . . optical composite device, 12 . . . corner portion, 13 . . . notch, 20 . . . light source unit, 21 . . . ceramic fluorescent body, 22 . . . reflecting film, 23 . . . antireflection film, 24 . . . intermediate film, 25 . . . dichroic mirror, 26 . . . lens, 27 . . . first blue laser oscillator, 29 . . . second blue laser oscillator

MODES FOR CARRYING OUT THE INVENTION

Embodiments to which the present disclosure is applied will be described with reference to the drawings.

1. First Embodiment

[1-1. Structure]

Figure 1A:
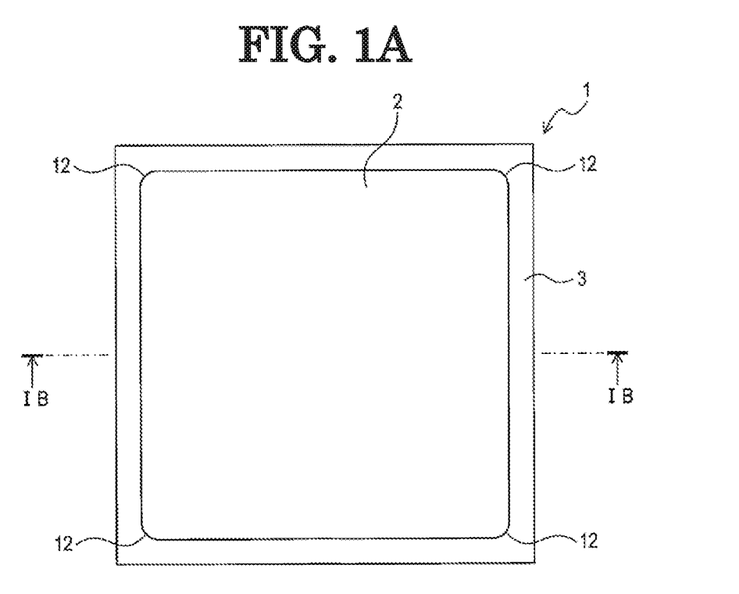
FIG. 1A is a schematic plan view of an optical wavelength conversion device of an embodiment.
Figure 1B:
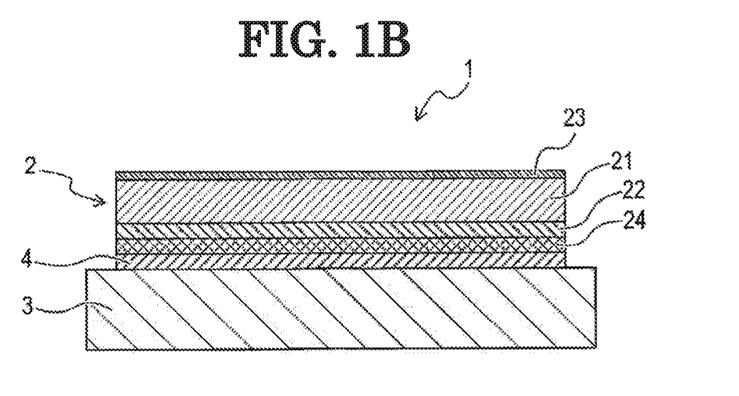
FIG. 1B is a schematic cross-sectional view taken along line IB-IB in FIG. 1A.

An optical wavelength conversion device 1 shown in FIGS. 1A and 1B includes an optical wavelength conversion member 2, a heat dissipation member 3, and a joint portion 4.

<Optical Wavelength Conversion Member>

The optical wavelength conversion member 2 is a member which converts the wavelength of incident light. The optical wavelength conversion member 2 includes a plate-shaped ceramic fluorescent body 21, a reflecting film 22, an antireflection film 23, and an intermediate film 24.

(Ceramic Fluorescent Body)

The ceramic fluorescent body 21 is a ceramic sintered body including a fluorescent phase containing fluorescent crystalline particles as a main component and a light-transmitting phase containing light-transmitting crystalline particles as a main component.

The "fluorescent phase" is a phase containing fluorescent crystalline particles as a main component, and the "light-transmitting phase" is a phase containing, as a main component, light-transmitting crystalline particles, specifically, crystalline particles having a composition different from that of the crystalline particles in the fluorescent phase.

The term "main component" means the highest content component of a phase. For example, the fluorescent phase contains the fluorescent crystalline particles in an amount of 50% by volume or more and preferably 90% by volume or more. For example, the light-transmitting phase contains the light-transmitting crystalline particles in an amount of 50% by volume or more and preferably 90% by volume or more.

The light-transmitting phase used may be, for example, alumina or glass. The light-transmitting phase may be a single crystal.

The crystalline particles in the ceramic sintered body forming the ceramic fluorescent body 21 and their grain boundaries may contain the light transmitting phase and unavoidable impurities other than the light-transmitting phase.

No particular limitation is imposed on the materials of the ceramic fluorescent body 21. For example, the crystalline particles in the light-transmitting phase may have a composition represented by chemical formula (1) $Al_2O_3$, and the crystalline particles the fluorescent phase may have a composition represented by chemical formula (2) $A_3B_5O_{12}$:Ce (i.e., the garnet structure).

Notably, "$A_3B_5O_{12}$:Ce" means a solid solution in which Ce is dissolved in $A_3B_5O_{12}$ and part of the element A is replaced with Ce. The solute Ce imparts fluorescence to the crystalline particles in the fluorescent phase.

The element A in chemical formula (1) and the element B in chemical formula (2) are each at least one element selected from the following groups of elements.

A: Sc, Y, and lanthanoids (except for Ce)
(Gd may be further contained as Al
B: Al (Ga may be further contained as B)

When the above ceramic sintered body is used as the ceramic fluorescent body 21, light scattering occurs at the interface between the fluorescent phase and the light-transmitting phase, so that the angular dependence of the color of light can be reduced. This can improve color uniformity.

The ceramic sintered body is excellent in thermal conductivity, so that heat generated by irradiation with laser light is easily dissipated to the heat dissipation member 3. Therefore, the fluorescent performance can be maintained even in a high laser power range.

When the ceramic fluorescent body 21 is a single component body, no light scattering occurs. In this case, the angular dependence of the color of light is large, and unevenness in the color of the light may occur. When a resin is used for the fluorescent body, its thermal conductivity is low, so that heat dissipation is insufficient. In this case, temperature quenching may occur.

The average thickness (i.e., the average distance from the upper surface to the lower surface) of the ceramic fluorescent body 21 is preferably from 100 μm to 500 μm inclusive.

(Reflecting Film)

The reflecting film 22 is disposed on the lower surface of the ceramic fluorescent body 21 (i.e., its surface on the heat dissipation member 3 side).

The reflecting film 22 reflects light generated inside the ceramic fluorescent body 21, so that the light is efficiently emitted to the outside of the optical wavelength conversion member 2. The light emission intensity of the optical wavelength conversion member 2 is thereby increased.

Examples of the material used for the reflecting film 22 include, in addition to metals such as metallic aluminum and silver, niobium oxide, titanium oxide, lanthanum oxide, tantalum oxide, yttrium oxide, gadolinium oxide, tungsten oxide, hafnium oxide, aluminum oxide, and silicon nitride.

Preferably, the average thickness of the reflecting film 22 is from 0.1 μm to 2 μm inclusive.

The reflecting film 22 may have a single-layer structure or a multilayer structure.

(Antireflection Film)

The antireflection film 23 is disposed on the upper surface of the ceramic fluorescent body 21 (i.e., its surface opposite to the heat dissipation member 3).

The antireflection film 23 is an anti-reflection coating (AR coating) which prevents light reflection from the ceramic fluorescent body 21. The antireflection film 23 allows the ceramic fluorescent body 21 to absorb light efficiently. Moreover, light generated inside the ceramic fluorescent body 21 can be efficiently extracted to the outside. As a result, the light emission intensity of the optical wavelength conversion member 2 is increased.

Examples of the material used for the antireflection film 23 include niobium oxide, titanium oxide, tantalum oxide, aluminum oxide, zirconium oxide, silicon oxide, aluminum nitride, silicon nitride, and magnesium fluoride.

Preferably, the average thickness of the antireflection film 23 is from 0.01 μm to 1 μm inclusive.

The antireflection film 23 may have a single-layer structure or a multilayer structure.

(Intermediate Film)

The intermediate film 24 is disposed on the lower surface of the reflecting film 22 (i.e., its surface opposite to the ceramic fluorescent body).

The intermediate film 24 is disposed between the reflecting film 22 and the joint portion 4 described later. Specifically, the joint portion 4 is joined to the intermediate film 24 of the optical wavelength conversion member 2. The intermediate film 24 improves the bonding between the joint portion 4 and the optical wavelength conversion member 2.

The intermediate film 24 includes a metal film and an oxide film.

The material used for the metal film may be gold, silver, nickel, etc. The material used for the oxide film may be aluminum oxide, titanium oxide, etc.

Preferably, the intermediate film 24 includes a nickel film serving as the metal film and an aluminum oxide film serving as the oxide film.

Preferably, the average thickness of the intermediate film 24 is from 0.01 μm to 1 μm inclusive.

As shown in FIG. 1A, at least one corner portion 12 of the optical wavelength conversion member 2 as viewed in its thickness direction is rounded. This reduces stress generated due to the difference in thermal expansion between the optical wavelength conversion member 2 and the heat dissipation member 3 when they are joined together. The joint strength is thereby improved, and heat dissipation is improved.

Moreover, stress generated in the optical wavelength conversion member 2 during irradiation with laser light tends to be uniform in plane directions. Therefore, forces acting on the upper and lower surfaces of the optical wavelength conversion member 2 can be reduced, so that breakage such as delamination of the optical wavelength conversion member 2 during operation can be prevented.

<Heat Dissipation Member>

The heat dissipation member 3 is more excellent in heat dissipation than the optical wavelength conversion member 2. The heat dissipation member 3 is attached to the optical wavelength conversion member 2 through the joint portion 4.

The heat dissipation member 3 facilitates dissipation of the heat generated in the ceramic fluorescent body 21 due to irradiation with laser light. As a result, the fluorescent performance of the ceramic fluorescent body 21 in a high power range is maintained.

The material used for the heat dissipation member 3 may be copper, aluminum, aluminum nitride, etc. of these, copper is preferred. The heat dissipation member 3 may have a main body made of a metal and an oxide film formed on the surface of the main body. The oxide film improves the joint strength with the joint portion 4.

The heat dissipation member 3 is formed into, for example, a plate shape. The heat dissipation member 3 may have a plate-shaped portion and at least one heat radiation fin protruding from the plate-shaped portion. The average thickness of the plate-Shaped portion of the heat dissipation member 3 is preferably from 0.1 mm to 5 mm inclusive.

To join the heat radiation fin and the plate-shaped portion together, friction stir welding (FSW) may be used. The FSW is a joining method for integrating members to be joined, and an increase in thermal resistance at the joint interface can be suppressed. Therefore, a reduction in the heat dissipation effect can be suppressed.

<Joint Portion>

The joint portion 4 joins the optical wavelength conversion member 2 and the heat dissipation member 3 together. In the present embodiment, the joint portion 4 is disposed between the lower surface of the intermediate film 24 of the optical wavelength conversion member 2 and the upper surface of the heat dissipation member 3 (i.e., its surface on the optical wavelength conversion member 2 side) and joins these two surfaces together.

The melting point of the joint portion 4 is 240° C. or higher. If the melting point of the joint portion 4 is lower than 240° C., the joint portion 4 melts due to heat from the optical wavelength conversion member 2 when the laser is in a high power range, and a defect such as delamination or breakage thereby occurs. The melting point of the joint portion 4 is preferably 300° C. or higher, more preferably 500° C. or higher, and still more preferably 800° C. or higher.

The thermal conductivity of the joint portion 4 is 120 W/mK or higher. A thermal conductivity of the joint portion 4 of less than 120 W/mK may be insufficient to dissipate heat from the optical wavelength conversion member 2 more effectively, and the fluorescent performance in a high laser power range may decrease. The thermal conductivity of the joint portion 4 is preferably 150 W/mK or higher.

The thermal conductivity of the joint portion 4 can be measured by, for example, a light pulse thermoreflectance method. Specifically, the optical wavelength conversion device 1 is cut obliquely with respect to its incident surface to expose the joint portion 4. The exposed portion is irradiated with pulsed light and laser light, and the reflected laser light is measured to obtain the thermal resistance of the joint portion 4. The thermal conductivity is computed from the obtained thermal resistance and the area and thickness of the joint portion 4.

No particular limitation is imposed on the material of the joint portion 4, so long as at least the melting point of the joint portion 4 satisfies the above condition. However, it is more preferable that the melting point and thermal conductivity of the joint portion 4 satisfy the above conditions. Moreover, to satisfy the above conditions, the joint portion 4 may be formed only of gold, silver, copper, or a combination thereof.

The joint portion 4 may have pores. When the joint portion 4 has pores, the difference in thermal expansion between the heat dissipation member 3 and the optical wavelength conversion member 2 is reduced, so that breakage of the joint portion 4 due to thermal shock can be prevented.

The joint portion 4 having pores can be obtained, for example, by sintering nanoparticles of any of the above metals. The nanoparticles are a group of particles having an average diameter of several nanometers to several micrometers and including particles whose sizes are on the order of nanometer. The joint portion 4 is preferably a sintered body of metal nanoparticles. In this sintered body, spaces between the nanoparticles bonded together by sintering serve as pores. The maximum width of the pores (i.e., the maximum pore diameter) is preferably 5 μm or less.

The porosity of the joint portion 4 is preferably from 1% to 40% inclusive. If the porosity is less than 1%, the effect of reducing the difference in thermal expansion between the heat dissipation member 3 and the optical wavelength conversion member 2 may not be obtained. If the porosity exceeds 40%, the heat transferability of the joint portion 4 may decrease, and this may cause a reduction in the heat dissipation efficiency of the optical wavelength conversion member 2.

The "porosity" is determined, for example, as the ratio of the area of the pores in an observation cross section obtained by observing a cross section of the joint portion 4 under a scanning electron microscope (SEM) (i.e., the ratio of the total area of the pores to the total area of the pores and a material layer).

The upper surface of the joint portion 4 (i.e., its surface on the optical wavelength conversion member 2 side) is joined to the entire lower surface of the optical wavelength conversion member 2 in the present embodiment, the joint portion 4 is disposed in the form of a layer only in a region sandwiched between the optical wavelength conversion member 2 and the heat dissipation member 3 (i.e., in part of the upper surface of the heat dissipation member 3).

Figure 2:
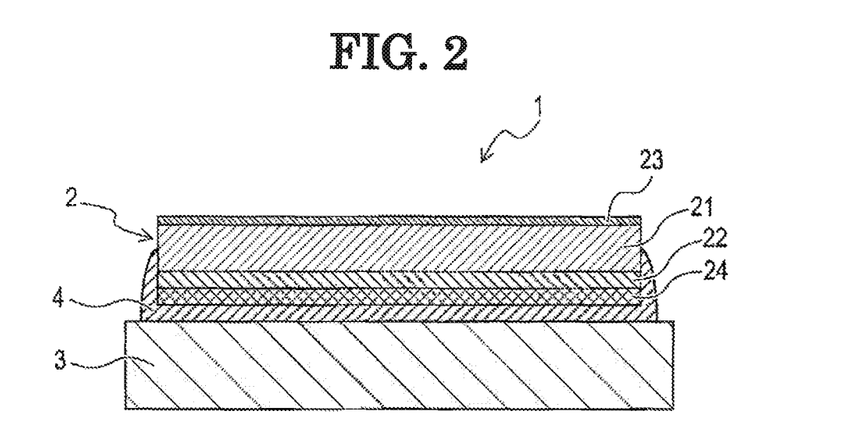
FIG. 2 is a schematic cross-sectional view of an optical wavelength conversion device of an embodiment different from that shown in FIG. 1B.

However, the joint portion 1 may be disposed in a region larger than the lower surface of the optical wavelength conversion member 2 and may be disposed so as to cover the entire upper surface of the heat dissipation member 3. As shown in FIG. 2, the joint portion 4 may be disposed so as to cover the side surfaces of the optical wavelength conversion member 2 (i.e., its surfaces parallel to the thickness direction). When the joint portion 4 covers the side surfaces of the optical wavelength conversion member 2, the joint portion 4 may also cover part of the upper surface of the optical wavelength conversion member 2 (i.e., the upper surface of the antireflection film 23).

In the joint portion 4, the average thickness of a joint region disposed between the optical wavelength conversion member 2 and the heat dissipation member 3 is preferably 1 μm or more. If the average thickness of the joint region is less than 1 μm, the joint strength of the joint portion 4 may be insufficient. Moreover, a sufficient heat dissipation path may not be provided between the optical wavelength conversion member 2 and the heat dissipation member 3.

The average thickness of the joint region is preferably equal to or less than 50% of the sum of the average thickness of the ceramic fluorescent body 21 and the average thickness of the joint region (the sum will be referred to as the total thickness). If the average thickness of the joint region exceeds 50% of the total thickness, the distance from the ceramic fluorescent body 21 to the heat dissipation member 3 is larger than the thickness of the ceramic fluorescent body 21. In this case, it is difficult to transfer the heat generated in the optical wavelength conversion member 2 rapidly to the heat dissipation member 3, and therefore the heat dissipation efficiency may deteriorate.

<Optical Composite Device>

Figure 3:
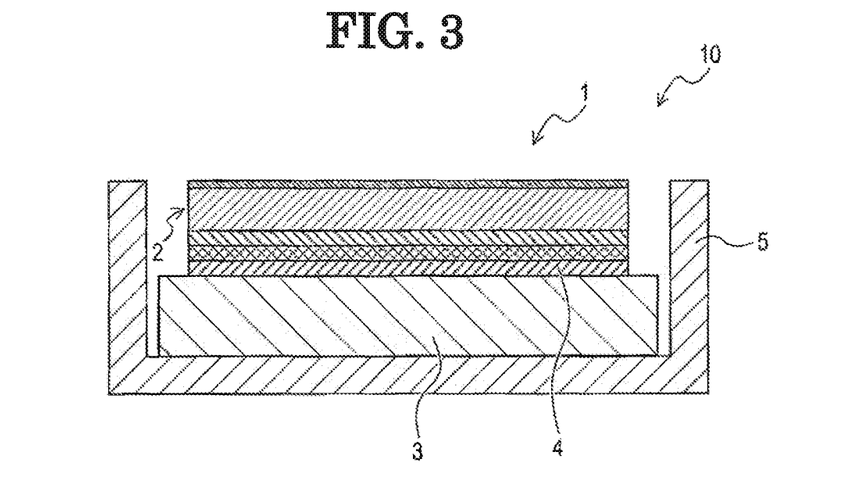
FIG. 3 is a schematic cross-sectional view of an optical composite device provided with the optical wavelength conversion device of one of the embodiments.

An optical composite device 10 shown in FIG. 3 includes the optical wavelength conversion device 1 and a package 5 which houses the optical wavelength conversion device 1.

The package 5 is a box-shaped container or a plate-shaped substrate. The package 5 contains, as a main component, a ceramic such as alumina. The "main component" means a component contained in an amount of, for example, 80% by mass or more. The package 5 may have a light emitting element-mounting region for mounting a light emitting element such as an LED or an LD.

Figure 4:
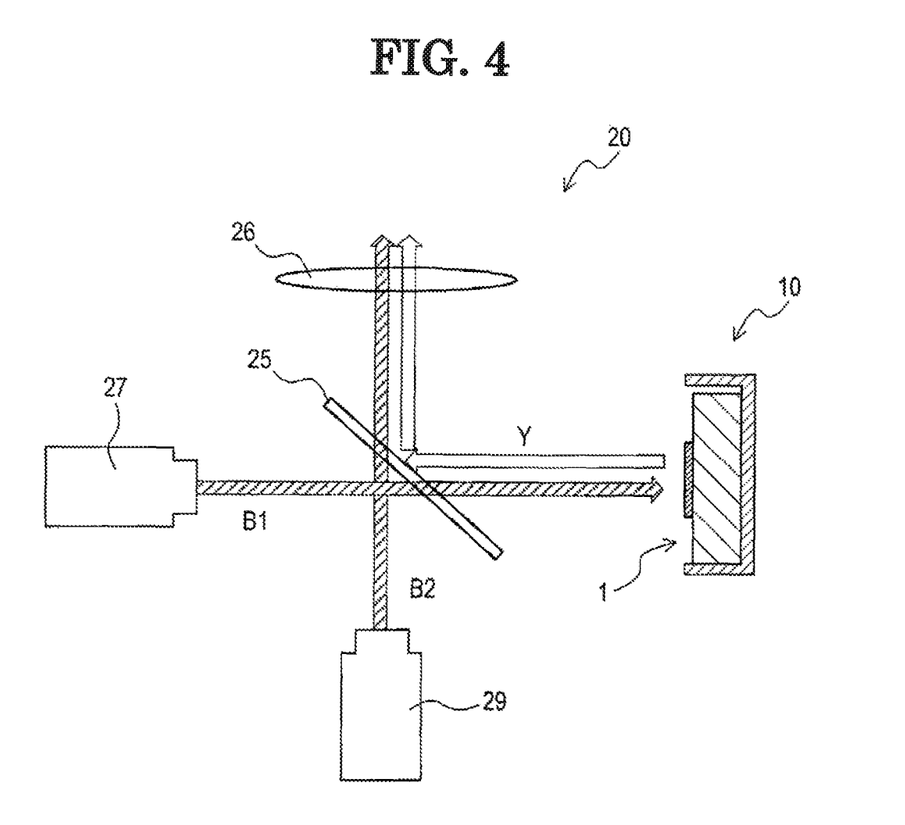
FIG. 4 is an illustration of a light source unit.

The optical composite device 10 is used for a light source unit 20 shown in FIG. 4. The light source unit 20 includes the optical composite device 10, a plurality of well-known blue laser oscillators (i.e., a first blue laser oscillator 27 and a second blue laser oscillator 29) each including a light-emitting element etc., a dichroic mirror 25, and a lens 26.

In the light source unit 20, first blue light B1 is emitted in the right direction in FIG. 4 from the first blue laser oscillator 27 toward the optical wavelength conversion device 1. The first blue light B1 is wavelength-converted and reflected by the optical wavelength conversion device 1 and is outputted as yellow light Y in the left direction in FIG. 4. The yellow light Y is reflected by the dichroic mirror 25 inclined 45° with respect to the left-right direction in FIG. 4 and is outputted toward the lens 26.

Second blue light B2 emitted in the upward direction in FIG. 4 from the second blue laser oscillator 29 toward the lens 26 passes through the dichroic mirror 25 and is outputted toward the lens 26 without any conversion.

The first blue light B1 and the yellow light Y are thereby mixed in the lens 26, and white light is generated. Therefore, in the light source unit 20, the white light is outputted upward in FIG. 4 from the lens 26.

[1-2. Effects]

The following effects are obtained by the embodiment described above in detail.

(1a) The melting point of the joint portion 4 is 240° C. or higher, so that, even when the temperature of the ceramic fluorescent body 21 increases due to laser irradiation and becomes high, the joint portion 4 joining the optical wavelength conversion member 2 and the heat dissipation member 3 together is unlikely to melt. In this case, high heat resistance and high joint strength can be maintained even in a high laser power range. Therefore, the heat dissipation path between the optical wavelength conversion member 2 and the heat dissipation member 5 can be maintained even in the high power range, and the heat can be dissipated from the optical wavelength conversion member 2 efficiently.

(1b) The thermal conductivity of the joint portion 4 is 120 W/mK or more. Therefore, the heat transfer performance of the joint portion 4 serving as the heat dissipation path between the optical wavelength conversion member 2 and the heat dissipation member 3 can be increased, and the heat can be dissipated from the optical wavelength conversion member 2 more efficiently.

2. Second Embodiment

[2-1. Structure]

Figure 5A:
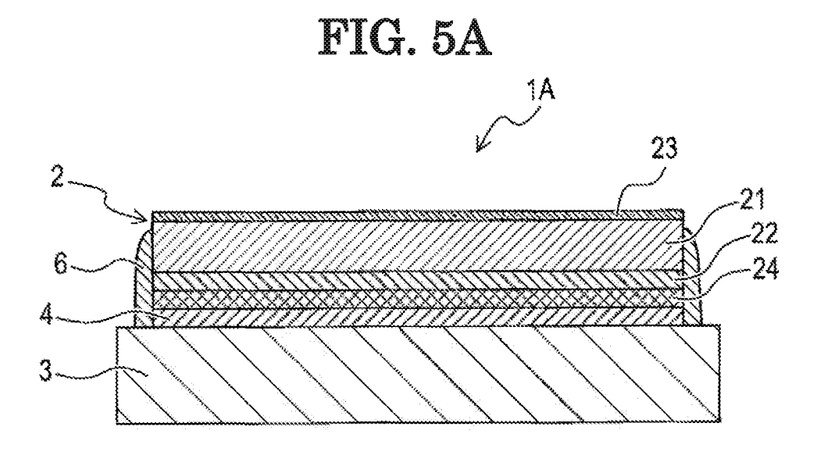
FIG. 5A is a schematic cross-sectional view of an optical wavelength conversion device of an embodiment different from those shown in FIGS. 1B and 2, and 5B is a schematic cross-sectional view of an optical wavelength conversion device of an embodiment different from those shown in FIGS. 1A, 1B, 2, and 5A.
Figure 5B:
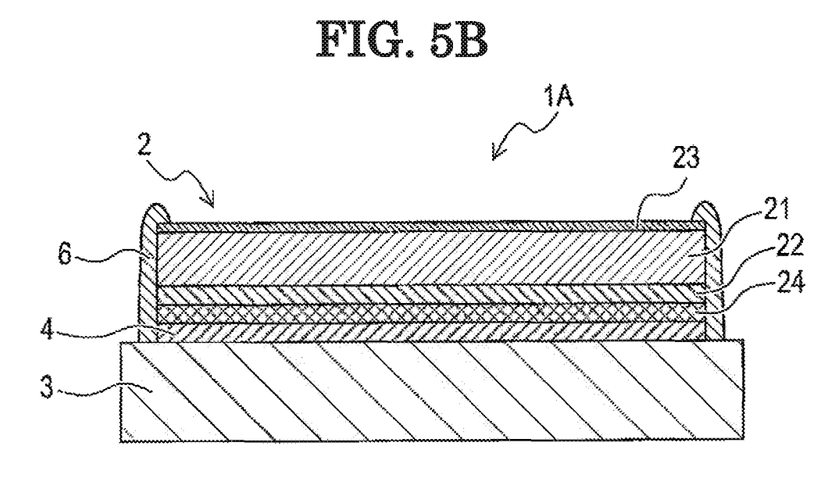

Optical wavelength conversion devices 1A shown in FIGS. 5A and 5B each include the optical wavelength conversion member 2, the heat dissipation member 3, the joint portion 4, and a resin layer 6.

Since the optical wavelength conversion member 2, the heat dissipation member 3, and the joint portion 4 are the same as those of the optical wavelength conversion device 1 in FIGS. 1A and 1B, they are denoted by the same reference numerals, and their description will be omitted.

The resin layer 6 at least partially covers (i.e., coats) a surface of the joint portion 4 which is not joined to the optical wavelength conversion member 2 and to the heat dissipation member 3.

In FIG. 5A, the resin layer 6 covers the entire side surfaces of the joint portion 4 and part of the side surfaces of the optical wavelength conversion member 2. The resin layer 6 also covers part of the upper surface of the heat dissipation member 3. Specifically, the resin layer 6 in FIG. 5A extends from the upper surface of the heat dissipation member 3 to the side surfaces of the ceramic fluorescent body 21.

The resin layer 6 may cover the entire side surfaces of the optical wavelength conversion member 2. As shown in FIG. 5B, the resin layer 6 may cover part of the upper surface of the optical wavelength conversion member 2 (i.e., the upper surface of the antireflection film 23) in addition to the entire side surfaces of the optical wavelength conversion member 2.

The main component of the resin layer 6 is preferably a fluoride-based resin. The use of the fluoride-based resin allows the resin layer 6 to have reduced permeability to water and gases such as $O_2$, $H_2S$, and $SO_2$, and oxidation (particularly in the case where copper is used for the joint portion 4), sulfurization (particularly in the case where silver is used for the joint portion 4), etc. at the interfaces of the joint portion 4 can be effectively prevented.

[2-2. Effects]

The following effects are obtained by the embodiment described above in detail.

(2a) The resin layer 6 can prevent oxidation, sulfurization, etc. at the joint interfaces of the joint portion 4. Therefore, the durability of the optical wavelength conversion devices 1A can be improved.

(2b) By covering the side surfaces of the optical wavelength conversion member 2 with the resin layer 6, oxidation, sulfurization, etc. of the optical wavelength conversion member 2 can also be prevented. Therefore, a decrease in fluorescence intensity due to deterioration of the optical wavelength conversion member 2 can be suppressed.

3. Second Embodiment

[3-1. Structure]

Figure 6A:
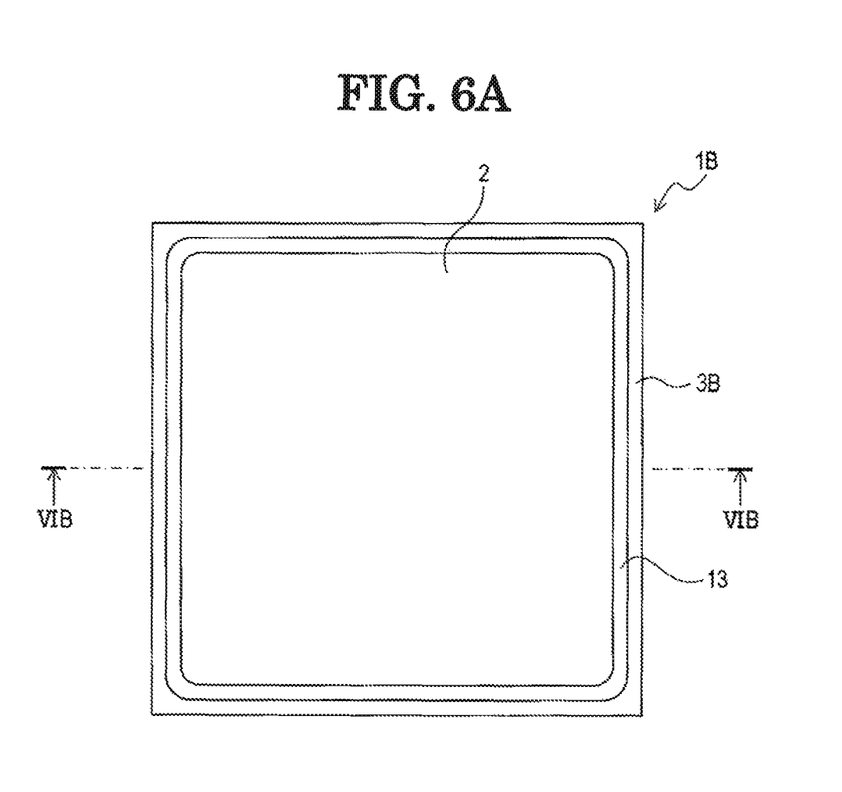
FIG. 6A is a schematic plan view of an optical wavelength conversion device of an embodiment different from those in FIGS. 1A, 1B, 2, 5A, and 5B.
Figure 6B:
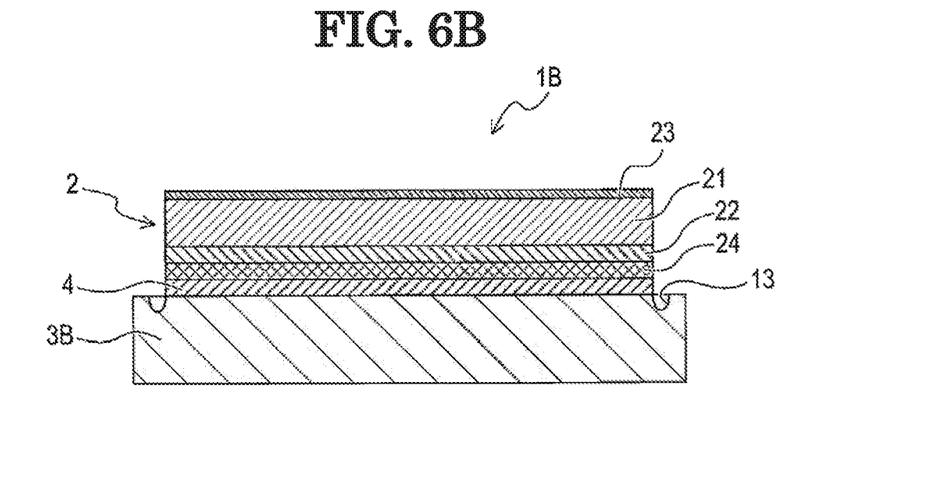
FIG. 6B is a schematic cross-sectional view taken along line VIB-VIB in FIG. 6A.

An optical wavelength conversion device 1B shown in FIGS. 6A and 6B includes the optical wavelength conversion member 2, a heat dissipation member 3B, and the joint portion 4.

Since the optical wavelength conversion member 2 and the joint portion 4 are the same as those of the optical wavelength conversion device 1 in FIGS. 1A and 1B, they are denoted by the same reference numerals, and their description will be omitted.

The heat dissipation member 3B of the present embodiment has a notch 13 disposed on its surface joined to the joint portion 4 (i.e., on the upper surface). In the present embodiment, the notch 13 is an annular groove disposed around the optical wavelength conversion member 2 and recessed toward the side opposite to the joint portion 4.

The notch 13 is formed such that inner edge is flush with the side surfaces of the optical wavelength conversion member 2 and the side surfaces of the joint portion 4. The notch 13 is disposed at a position which does not overlap the optical wavelength conversion member 2 and the joint portion 4 in the thickness direction. Specifically, the notch 13 is not joined to the joint portion 4 and is exposed at the upper surface of the heat dissipation member 3B.

The notch 13 may be disposed at a position overlapping the optical wavelength conversion member 2 and the joint portion 4. The notch 13 is not limited to the annular notch. The heat dissipation member 3B may have a plurality of notches 13.

[3-2. Effects]

The following effects are obtained by the embodiment described above in detail.

(3a) The notch 13 of the heat dissipation member 3B can reduce stress generated due to the difference in thermal expansion between the optical wavelength conversion member 2 and the heat dissipation member 3 when they are joined together. Therefore, the joint strength is improved, and the heat dissipation is improved. Moreover, since thermal stress generated in the heat dissipation member 3B in a high temperature environment is reduced, breakage such as delamination of the optical wavelength conversion member 2 during operation can be prevented.

4. Other Embodiments

The embodiments of the present disclosure have been described. However, it will be appreciated that the present disclosure is not limited to the above embodiments and can be implemented in various forms.

(4a) In the optical wavelength conversion devices 1, 1A, and 1B of the above embodiments, the optical wavelength conversion member 2 does not necessarily have the antireflection film 23 and the intermediate film 24.

The optical wavelength conversion member 2 may have a film or a layer other than the ceramic fluorescent body 21, the reflecting film 22, the antireflection film 23, and the intermediate film 24. For example, the optical wavelength conversion member 2 may have an auxiliary joint layer disposed between the intermediate film 24 and the joint portion 4. This auxiliary joint layer is provided for the purpose of improving the joint strength between the intermediate film 24 and the joint portion 4 and is formed of, for example, a metal.

(4b) The function of one component in any of the above embodiments may be distributed to a plurality of components, or the functions of a plurality of components may be realized by one component. Part of the structure of each of the above embodiments may be omitted. At least part of the structure of any of the above embodiments may be added to or partially replace the structures of other embodiments. All modes included in the technical idea specified by the wording of the claims are embodiments of the present disclosure.

5. Examples

The details of tests performed to examine the effects of the present disclosure and evaluation of the effects will be described.

Example 1

(Production of Ceramic Fluorescent Body)

Particles of $Al_2O_3$ (average particle diameter: 0.2 μm), particles of $Y_2O_3$ (average particle diameter: 1.2 μm), particles of $Gd_2O_3$ (average particle diameter: 1.1 μm), and particles of $CeO_2$ (average particle diameter: 1.5 μm) were weighed such that the amount of $A_3B_5O_{12}$:Ce was 30% by volume with respect to the total volume of a sintered body.

These particles and ethanol were placed in a ball mill and pulverized and mixed for 16 hours. The slurry obtained was dried and granulated, and the granulated powder was subjected to press forming. The compact obtained was fired in an air atmosphere at a firing temperature of 1600° C. for a holding time of 10 hours to thereby produce a ceramic fluorescent body. The relative density of the obtained ceramic fluorescent body was 99% or higher, and the ceramic fluorescent body was sufficiently dense. The relative density was determined from a porosity measured according to JIS-R1634 (1998).

(Formation of Reflecting Film and Antireflection Film)

The ceramic fluorescent body obtained was shaped into a 16 mm by 16 mm square plate with an average thickness of 200 μm. An antireflection film was formed on the upper surface of the ceramic fluorescent body, and a reflecting film and an intermediate film were formed on the lower surface to thereby obtain an optical wavelength conversion member.

The antireflection film formed was a multilayer coating including an $SiO_2$ layer and a $Ta_2O_5$ layer, and the reflecting film formed was a multilayer coating including a $TiO_2$ layer and an Ag layer. Moreover, the intermediate film formed was a multilayer coating including a Ni layer and an $Al_2O_3$ layer.

(Joining of Optical Wavelength Conversion Member to Heat Dissipation Member)

The optical wavelength conversion member obtained through the above steps was cut into a 3.5 mm by 3.5 mm square piece. A copper-made heat dissipation member was cut into a 12 mm by 12 mm square plate with an average thickness of 2 mm.

Silver nanoparticles, copper nanoparticles, or a particle mixture of the silver nanoparticles and the copper nanoparticles disposed between the cut, optical wavelength conversion member and the cut heat dissipation member was sintered to form a joint portion. In this manner, optical wavelength conversion device samples 1 to 3 were obtained. The melting point and thermal conductivity of the joint portion in each sample are shown in Table 1.

(Laser Power Resistance Performance)

Each sample was irradiated with laser light having a wavelength of 465 nm (i.e., blue LD light) and focused through a lens to a width of 1 mm. The X chromaticity value of the light reflected from each sample was measured using a spectroradiometer ("CL:500A" manufactured by KONICA MINOLTA, INC.). In this measurement, the power density of the blue ID light used for irradiation was gradually increased from 0 $W/mm^2$ to 200 $W/mm^2$.

The power density when the chromaticity value was reduced to 60% or less of the chromaticity value at a power density of 5 $W/mm^2$ was determined as a power density at which temperature quenching had occurred and used as the laser power resistance performance of the sample. The results are shown in Table 1. When the laser power resistance performance is 90 $W/mm^2$ or more, the laser power resistance performance is judged as good.

(Porosity)

A cross section obtained by cutting the joint portion of each sample was observed under an SEM to obtain a cross-sectional image at 5000×. Image analysis software "WinROOF" was used to binarize the cross-sectional image including the material layer and the pores. The area ratio of the pores in the binarized image was computed and used as the porosity of the joint portion. The results are shown in Table 1.

(Heat Resistance)

Each sample was subjected to thermal cycles in which the temperature of the atmosphere was repeatedly changed from −50° C. to 150° C. After 1000 cycles, the laser power resistance performance was evaluated, and the ratio of the laser power resistance performance after the thermal cycles to the laser power resistance performance before the thermal cycles was determined. This ratio is preferably 80% or more.

Comparative Examples

An optical wavelength conversion member and a heat dissipation member identical to those in Example 1 were prepared, and a silicone paste (thermal conductivity: 0.9 W/mK), a conductive paste containing silver (thermal conductivity: 14 W/mK), and solder (thermal conductivity: 60 W/mK) were used to form respective joint portions to thereby obtain optical wavelength conversion device samples 4 to 6. The results of measurement of the laser power resistance performance and porosity of each sample are shown in Table 1.

Example 2

An optical wavelength conversion member and a heat dissipation member identical to those in Example 1 were prepared, and silver nanoparticles were used to form a joint portion having a porosity different from that in Example 1. In this manner, optical wavelength conversion device samples 7 to 12 were obtained. The results of measurement of the laser power resistance performance and porosity of each sample are shown in Table 1.

Example 3

Optical wavelength conversion device samples 13 to 24 were obtained by the same procedure as in Example 1 except that $Al_2O_3$ particles (average particle diameter: 0.2 μm), $Y_2O_3$ particles (average particle diameter: 1.2 μm), $Gd_2O_3$ particles (average particle diameter: 1.1 μm), $CeO_2$ particles (average particle diameter: 1.5 μm), $Lu_2O_3$ particles (average particle diameter: 1.1 μm), $Sc_2O_3$ particles (average particle diameter: 1.2 μm), and $Ga_2O_3$ particles (average particle diameter: 1.1 μm) were weighed such that the amount of $A_3B_5O_{12}$:Ce was 30% by volume with respect to the total volume of a sintered body and that a composition shown in Table 1 was obtained. The results of measurement of the laser power resistance performance and porosity of each sample are shown in Table 1.

Example 4

Optical wavelength conversion device samples 25 to 30 were obtained by the same procedure as in Example 1 except that the average thickness of the ceramic fluorescent body and the average thickness of the joint region in the joint portion were changed as shown in Table 1. The results of measurement of the laser power resistance performance and porosity of each sample are shown in Table 1. In sample 30, the laser power resistance performance could not be measured because of insufficient strength of the joint portion.

Example 5

An optical wavelength conversion device sample 31 was obtained by the same procedure as in Example 1 except that the side surfaces of the joint portion were covered with a fluorine-based resin layer. An optical wavelength conversion device sample 32 was obtained by the same procedure as in Example 1 except that a notch was formed on the upper surface of the heat dissipation member. An optical wavelength conversion device sample 33 was obtained by the same procedure as in Example 1 except that corner portions of the optical wavelength conversion member when it was viewed in its thickness direction were rounded so as to have a radius of 5 mm.

An optical wavelength conversion device sample 34 including a combination of the resin layer and the notch was obtained, and an optical wavelength conversion device sample 35 including a combination of the resin layer and the rounded corner portions was obtained. Moreover, an optical wavelength conversion device sample 36 including a combination of the resin layer, the notch, the rounded corner portions was obtained. The results of measurement of the laser power resistance performance and porosity of each sample are shown in Table 1.

TABLE 1

| | No. | Joining material | Thermal conductivity of joint portion (W/mK) | Melting point of joint portion (°C.) | Ceramic fluorescent body | A | B | Average thickness of fluorescent body (μm) | Average thickness of joint portion (μm) | Porosity of joint portion (%) | Thickness ratio of joint portion (%) | Laser power resistance performance (W/mm²) | Laser power ratio (%) |
|---|---|---|---|---|---|---|---|---|---|---|---|---|---|
| Example 1 | 1 | Silver nanoparticles | 230 | 960 | $Al_2O_3$—$A_3B_5O_{12}$:Ce | Y, Gd | Al | 200 | 30 | 0.6 | 13 | 140 | 82 |
| | 2 | Copper nanoparticles | 200 | 1000 | $Al_2O_3$—$A_3B_5O_{12}$:Ce | Y, Gd | Al | 200 | 30 | 0.5 | 13 | 120 | 81 |
| | 3 | Silver-copper nanoparticle mixture | 210 | 980 | $Al_2O_3$—$A_3B_5O_{12}$:Ce | Y, Gd | Al | 200 | 30 | 0.7 | 13 | 112 | 83 |
| Comparative Example | 4 | Silicone paste | 0.9 | 220 | $Al_2O_3$—$A_3B_5O_{12}$:Ce | Y, Gd | Al | 200 | 30 | 0.6 | 13 | 40 | 62 |
| | 5 | Conductive paste | 11 | 200 | $Al_2O_3$—$A_3B_5O_{12}$:Ce | Y, Gd | Al | 200 | 30 | 0.6 | 13 | 55 | 51 |
| | 6 | Solder | 60 | 230 | $Al_2O_3$—$A_3B_5O_{12}$:Ce | Y, Gd | Al | 200 | 30 | 0.6 | 13 | 75 | 75 |
| Example 2 | 7 | Silver nanoparticles | 230 | 960 | $Al_2O_3$—$A_3B_5O_{12}$:Ce | Y, Gd | Al | 200 | 30 | 0.1 | 13 | 145 | 82 |
| | 8 | Silver nanoparticles | 230 | 960 | $Al_2O_3$—$A_3B_5O_{12}$:Ce | Y, Gd | Al | 200 | 30 | 1 | 13 | 130 | 83 |
| | 9 | Silver nanoparticles | 230 | 960 | $Al_2O_3$—$A_3B_5O_{12}$:Ce | Y, Gd | Al | 200 | 30 | 5 | 13 | 125 | 83 |
| | 10 | Silver nanoparticles | 230 | 960 | $Al_2O_3$—$A_3B_5O_{12}$:Ce | Y, Gd | Al | 200 | 30 | 10 | 13 | 108 | 84 |

TABLE 1-continued

| | No. | Joining material | Thermal conductivity of joint portion (W/mK) | Melting point of joint portion (° C.) | Ceramic fluorescent body | A | B | Average thickness of fluorescent body (μm) | Average thickness of joint portion (μm) | Porosity of joint portion (%) | Thickness ratio of joint portion (%) | Laser power resistance performance (W/mm$^2$) | Laser power ratio (%) |
|---|---|---|---|---|---|---|---|---|---|---|---|---|---|
| | 11 | Silver nanoparticles | 230 | 960 | $Al_2O_3$—$A_3B_5O_{12}$:Ce | Y, Gd | Al | 200 | 30 | 40 | 13 | 105 | 82 |
| | 12 | Silver nanoparticles | 230 | 960 | $Al_2O_3$—$A_3B_5O_{12}$:Ce | Y, Gd | Al | 200 | 30 | 45 | 13 | 92 | 81 |
| Example 3 | 13 | Silver nanoparticles | 230 | 960 | $Al_2O_3$—$A_3B_5O_{12}$:Ce | Y, Gd | Al, Ga | 200 | 30 | 0.008 | 13 | 110 | 82 |
| | 14 | Silver nanoparticles | 230 | 960 | $Al_2O_3$—$A_3B_5O_{12}$:Ce | Y | Al, Ga | 200 | 31 | 0.009 | 13 | 142 | 81 |
| | 15 | Silver nanoparticles | 230 | 960 | $Al_2O_3$—$A_3B_5O_{12}$:Ce | Y, Gd | Al | 200 | 30 | 0.006 | 13 | 140 | 81 |
| | 16 | Silver nanoparticles | 230 | 960 | $Al_2O_3$—$A_3B_5O_{12}$:Ce | Y | Al | 200 | 29 | 0.004 | 13 | 145 | 83 |
| | 17 | Silver nanoparticles | 230 | 960 | $Al_2O_3$—$A_3B_5O_{12}$:Ce | Lu, Gd | Al, Ga | 200 | 30 | 0.006 | 13 | 120 | 84 |
| | 18 | Silver nanoparticles | 230 | 960 | $Al_2O_3$—$A_3B_5O_{12}$:Ce | Lu | Al, Ga | 200 | 29 | 0.005 | 13 | 146 | 82 |
| | 19 | Silver nanoparticles | 230 | 960 | $Al_2O_3$—$A_3B_5O_{12}$:Ce | Lu, Gd | Al | 200 | 31 | 0.006 | 13 | 143 | 81 |
| | 20 | Silver nanoparticles | 230 | 960 | $Al_2O_3$—$A_3B_5O_{12}$:Ce | Lu | Al | 200 | 33 | 0.007 | 14 | 150 | 81 |
| | 21 | Silver nanoparticles | 230 | 960 | $Al_2O_3$—$A_3B_5O_{12}$:Ce | Sc, Gd | Al, Ga | 200 | 34 | 0.008 | 15 | 110 | 82 |
| | 22 | Silver nanoparticles | 230 | 960 | $Al_2O_3$—$A_3B_5O_{12}$:Ce | Sc | Al, Ga | 200 | 32 | 0.006 | 14 | 115 | 83 |
| | 23 | Silver nanoparticles | 230 | 960 | $Al_2O_3$—$A_3B_5O_{12}$:Ce | Sc, Gd | Al | 200 | 30 | 0.007 | 13 | 105 | 81 |
| | 24 | Silver nanoparticles | 230 | 960 | $Al_2O_3$—$A_3B_5O_{12}$:Ce | Sc | Al | 200 | 29 | 0.005 | 13 | 120 | 81 |
| Example 4 | 25 | Silver nanoparticles | 230 | 960 | $Al_2O_3$—$A_3B_5O_{12}$:Ce | Y, Gd | Al | 100 | 105 | 0.005 | 51 | 90 | 82 |
| | 26 | Silver nanoparticles | 230 | 960 | $Al_2O_3$—$A_3B_5O_{12}$:Ce | Y, Gd | Al | 100 | 100 | 0.004 | 50 | 105 | 81 |
| | 27 | Silver nanoparticles | 230 | 960 | $Al_2O_3$—$A_3B_5O_{12}$:Ce | Y, Gd | Al | 200 | 25 | 0.006 | 11 | 116 | 83 |
| | 28 | Silver nanoparticles | 230 | 960 | $Al_2O_3$—$A_3B_5O_{12}$:Ce | Y, Gd | Al | 200 | 5 | 0.005 | 2 | 120 | 81 |
| | 29 | Silver nanoparticles | 230 | 960 | $Al_2O_3$—$A_3B_5O_{12}$:Ce | Y, Gd | Al | 500 | 1 | 0.006 | 0.2 | 125 | 82 |
| Example 5 | 30 | Silver nanoparticles | 230 | 960 | $Al_2O_3$—$A_3B_5O_{12}$:Ce | Y, Gd | Al | 500 | 0.5 | 0.007 | 0.1 | — | 81 |
| | 31 | Silver nanoparticles | 230 | 960 | $Al_2O_3$—$A_3B_5O_{12}$:Ce | Y, Gd | Al | 200 | 30 | 0.6 | 13 | 140 | 90 |
| | 32 | Silver nanoparticles | 230 | 960 | $Al_2O_3$—$A_3B_5O_{12}$:Ce | Y, Gd | Al | 200 | 30 | 0.5 | 13 | 160 | 91 |
| | 33 | Silver nanoparticles | 230 | 960 | $Al_2O_3$—$A_3B_5O_{12}$:Ce | Y, Gd | Al | 200 | 30 | 0.7 | 13 | 170 | 92 |
| | 34 | Silver nanoparticles | 230 | 960 | $Al_2O_3$—$A_3B_5O_{12}$:Ce | Y, Gd | Al | 200 | 30 | 0.4 | 13 | 175 | 97 |
| | 35 | Silver nanoparticles | 230 | 960 | $Al_2O_3$—$A_3B_5O_{12}$:Ce | Y, Gd | Al | 200 | 30 | 0.5 | 13 | 175 | 97 |
| | 36 | Silver nanoparticles | 230 | 960 | $Al_2O_3$—$A_3B_5O_{12}$:Ce | Y, Gd | Al | 200 | 30 | 0.5 | 13 | 180 | 99 |

<Discussion>

As can be seen in Table 1, in Examples 1 to 4 in which the joint portion has a thermal conductivity of 120 W/mK or more and a melting point of 240° C. or higher, the laser power resistance performance is good. Therefore, the samples in Examples 1 to 4 can be used in a high laser power range. In the Comparative Example in which the joint portion has a thermal conductivity of less than 120 W/mK and a melting point of lower than 240° C., temperature quenching occurs in a high laser power range. Therefore, the samples in the Comparative Example cannot be used in the high power range.

As can be seen from the results in Example 2, optical wavelength conversion devices in which the porosity of the joint portion is 40% or less can be used in a higher power range. As can be seen from the results in Example 3, optical wavelength conversion devices whose ceramic fluorescent bodies have different compositions can be used in a high power range.

As can be seen from the results in Example 4, optical wavelength conversion devices in which the ratio of the average thickness of the joint region in the joint portion to the total thickness of the ceramic fluorescent body and the joint region ("average thickness ratio of joint portion" in Table 1) is 50% or less can be used in a higher power range.

As can be seen from the results in Example 5, when the joint portion is covered with the resin layer, a decrease in laser power resistance performance after heating at high temperature for a long time can be suppressed. As can be seen, the notch and the rounded corner portions improve the joint strength of each optical wavelength conversion device, and the laser power resistance performance is improved.

What is claimed is:

1. An optical wavelength conversion device comprising:
    an optical wavelength conversion member configured to convert the wavelength of incident light;
    a heat dissipation member which is more excellent in heat dissipation than the optical wavelength conversion member;
    a joint portion which joins the optical wavelength conversion member and the heat dissipation member together; and
    a resin layer which covers a side surface of the joint portion, wherein the side surface of the joint portion is not joined to the optical wavelength conversion member or to the heat dissipation member, and which does not cover a side surface of the heat dissipation member,
    wherein the optical wavelength conversion member includes:
        a plate-shaped ceramic fluorescent body; and
        a reflecting film disposed on a heat dissipation member-side surface of the ceramic fluorescent body,
    wherein the joint portion has a thermal conductivity of 120 W/mK or more and a melting point of 240° C. or higher,
    wherein the resin layer contains a fluorine-based resin as a main component,
    wherein the resin layer covers an entire side surface of the ceramic fluorescent body,
    wherein the heat dissipation member has at least one notch on its surface joined to the joint portion, and
    wherein the notch is disposed at a position which does not overlap the optical wavelength conversion member and the joint portion in a thickness direction of the optical wavelength conversion device.

2. The optical wavelength conversion device according to claim 1, wherein the joint portion is formed only of gold, silver, copper, or a combination thereof.

3. The optical wavelength conversion device according to claim 1, wherein the joint portion has pores, and
    wherein the joint portion has a porosity of 40% or less.

4. The optical wavelength conversion device according to claim 1, wherein the joint portion has a joint region disposed between the optical wavelength conversion member and the heat dissipation member, and the average thickness of the joint region is 1 or more.

5. The optical wavelength conversion device according to claim 1, wherein the joint portion has a joint region disposed between the optical wavelength conversion member and the heat dissipation member, and the average thickness of the joint region is equal to or less than 50% of the sum of the average thickness of the ceramic fluorescent body and the average thickness of the joint region.

6. The optical wavelength conversion device according to claim 1, wherein at least one corner portion of the optical wavelength conversion member as viewed in a thickness direction thereof is rounded.

* * * * *

UNITED STATES PATENT AND TRADEMARK OFFICE
CERTIFICATE OF CORRECTION

| | |
|---|---|
| PATENT NO. | : 11,287,107 B2 |
| APPLICATION NO. | : 16/968693 |
| DATED | : March 29, 2022 |
| INVENTOR(S) | : Takaku et al. |

It is certified that error appears in the above-identified patent and that said Letters Patent is hereby corrected as shown below:

In the Claims

Claim 4, Column 18, Line 17, replace "is 1 or more." with "is 1 µm or more."

Signed and Sealed this
Thirty-first Day of May, 2022

Katherine Kelly Vidal
*Director of the United States Patent and Trademark Office*